United States Patent [19]

Hayashi

[11] Patent Number: 4,598,407
[45] Date of Patent: Jul. 1, 1986

[54] ORTHOGONAL TYPE GAS LASER OSCILLATOR

[75] Inventor: Eikichi Hayashi, Nagoya, Japan

[73] Assignee: Mitsubishi Denki Kabushiki Kaisha, Tokyo, Japan

[21] Appl. No.: 632,463

[22] Filed: Jul. 19, 1984

[30] Foreign Application Priority Data

Jul. 27, 1983 [JP] Japan .................... 58-137157

[51] Int. Cl.$^4$ ............................................. H01S 3/097
[52] U.S. Cl. ...................................... 372/87; 372/93; 372/83; 372/58
[58] Field of Search ............ 372/87, 88, 58, 93, 372/92, 83, 700

[56] References Cited

U.S. PATENT DOCUMENTS 3,895,313  7/1975  Seitz ..................... 372/93

Primary Examiner—Léon Scott, Jr.
Attorney, Agent, or Firm—Oblon, Fisher, Spivak, McClelland & Maier

[57] ABSTRACT

An orthogonal type gas laser oscillator is constructed in such a manner that a laser medium gas is caused to flow through an exciting region for the laser oscillation to perform the laser oscillation on the optical axis which runs in the direction orthogonal to the flowing direction of the laser medium gas; the exciting region is provided independently in even number and the flowing direction of the laser medium gas in one half of the exciting region and the flowing direction of the laser medium gas in the remaining half of the exciting region are mutually opposed.

17 Claims, 8 Drawing Figures

FIGURE 1 *PRIOR ART*
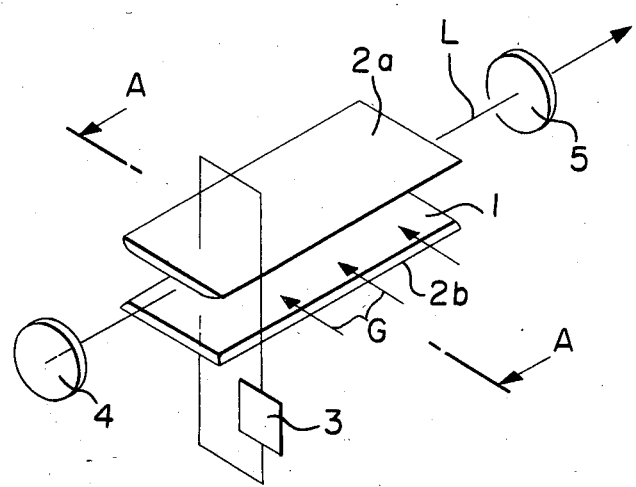
FIGURE 2 *PRIOR ART*
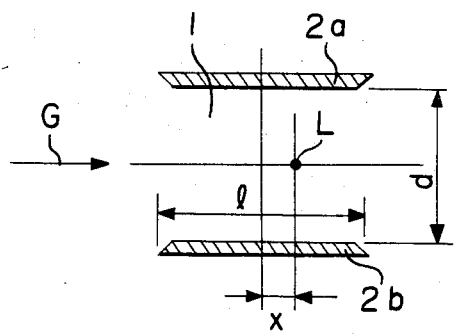

ORTHOGONAL TYPE GAS LASER OSCILLATOR

BACKGROUND OF THE INVENTION

1. Field of the Invention

This invention relates to a gas laser oscillator, and more particularly, it is concerned with improvement in stability of the laser beam to be oscillated from an orthogonal type gas laser oscillator which performs the laser oscillation by causing a laser medium gas to flow in the direction orthogonal to the resonant optical axis.

2. Description of the Prior Art

As this type of gas laser oscillator, there has so far been known, for example, a carbon dioxide ($CO_2$) gas laser oscillator of a triaxially orthogonal discharge excitation system, in which $CO_2$ gas molecules are used as the laser medium gas, the laser excitation is carried out by the electric discharge excitation, and the resulting laser beam is taken out in the direction orthogonal to the electric discharge direction and the flowing direction of the laser medium gas.

FIGS. 1 and 2 of the accompanying drawing illustrate a conventional orthogonal type gas laser oscillator, in which FIG. 1 is a perspective view showing a schematic construction of such gas laser oscillator, and FIG. 2 is a cross-sectional view of the orthogonal type gas laser oscillator shown in FIG. 1 taken along a line A—A. In each of these two figures of drawing, a reference numeral 1 designates an excitation range where laser excitation is carried out by electric discharge of the laser medium gas such as $CO_2$ gas molecules, and so forth, reference numerals 2a and 2b represent electrodes oppositely disposed on both sides of the excitation range 1, a numeral 3 refers to a power source for applying an electric voltage across both electrodes 2a and 2b to form the electric discharge, and numerals 4 and 5 respectively refer to a total reflection mirror and a partial reflection mirror provided at both ends in the longitudinal direction of the electrodes 2a and 2b defining the excitation range 1. A reference letter G designates a laser gas stream of the laser medium gas flowing in the direction of arrows, and a reference letter L represents a resonant optical axis spanning between the total reflection mirror 4 and the partial reflection mirror 5.

In the following, explanations will be given as to the operations of the conventional orthogonal type gas laser oscillator in reference to FIGS. 1 and 2. First of all, a laser medium gas containing $CO_2$ gas molecules is continuously fed into the excitation region 1, during which the flowing direction of the laser medium gas stream G is set at the right angle with respect to the resonant optical axis L. Then electric voltage is applied across the electrodes 2a and 2b from the power source 3 to form an electric discharge between them, with which the laser medium gas containing therein the $CO_2$ gas molecules is excited and the laser beam peculiar to the $CO_2$ gas molecules (wavelength of 10.6 $\mu$m) is emitted. The thus oscillated laser beam is resonantly amplified between the total reflection mirror 4 and the partial reflection mirror 5, both of which are disposed on the resonant optical axis L, so that the laser beam output may be taken out of the partial reflection mirror 5. In this case, the resonant optical axis L of the laser beam dislocate to the drownstream side of the laser gas stream G from the center of the electrodes 2a and 2b by a quantity x, when viewed from the cross-section of the optical axis, as shown in FIG. 2. This dislocation in the resonant optical axis is derived from the particular nature of the orthogonal type gas laser oscillator such that, outside the exciting period when electrons created by the electric discharge between the electrodes 2a and 2b directly act on the $CO_2$ gas molecules to excite them, the center of electric discharge and the center of excitation are displaced in the direction of the laser gas stream G, in the case of ordinary $CO_2$ laser, owing to a relationship between the energy imparting time to the $CO_2$ gas molecules of the $N_2$ gas molecules to be mixed into the laser medium gas and the moving speed of the $CO_2$ gas molecules. The above-mentioned quantity x is determined by various factors such as (1) a flow rate of the laser gas current G, and configuration of each of the electrodes 2a and 2b; (2) an excitation input, excitation width (l), and excitation gap (d); (3) composition and density of the laser medium gas; and others.

Since the conventional orthogonal type gas laser oscillator is constructed as such, the quantity of dislocation x between the center of electric discharge and the center of exciation varies with respect to the electric discharge input as the excitation input. On account of this, even if all the factors other than the variations in the excitation input out of the above-mentioned factors to determine the value x are fixed, the resonant optical axis L is required to be varied in correspondence to variations in the excitation input, when the laser beam output is controlled. Conversely, if it is assumed that the resonant optical axis L is fixed, there inevitably takes place an inconvenience such that the laser beam output does not vary linearly with respect to the variations in the excitation input. Further, the laser medium gas flowing into the excitation region 1 and the laser medium gas flwoing out of the excitation region 1 have a temperature difference of at every cross-section at point of the resonant optical axis L, on account of which there have been such inconveniences that the resonant optical axis L is bent or the optical distortion is created due to difference in the refractive index caused by the temperature variations of the laser medium gas. As the consequence of this, there inevitably accompany such disdvantages that the conventional gas laser oscillator lacks in stability of the optical axis of the laser beam to be generated, stability in the laser output, stabilized quality of the laser beam, and so forth, all being the important factors in the performance of the orthogonal type gas laser oscillator.

The present invention has been made with a view to improving the above-mentioned disadvantages inherent in the conventional orthogonal gas laser oscillator.

SUMMARY OF THE INVENTION

It is therefore the primary object of the present invention to provide an orthogonal type gas laser oscillator with stabilized optical axis of the laser beam, laser output, laser beam quality, and so forth.

According to the present invention, in general aspect of it, there is provided an orthogonal type gas laser oscillator, even number of laser exciting ranges, each being independent and defined by a pair of opposing electrodes, where laser oscillation is effected; laser medium gas which is caused to flow in a predetermined direction through one half of said even number of laser exciting ranges, and caused to flow through the remaining one half of said laser exciting ranges in a direction opposite to said predetermined direction; and a laser resonator which performs the laser oscillation to output laser beam in the direction perpendicular to the flowing direction of said laser medium gas.

BRIEF DESCRIPTION OF THE DRAWINGS

The foregoing object, other objects as well as the specific construction and function of the orthogonal type gas laser oscillator according to the present invention will become more apparent and understandable from the following detailed description thereof, when read in conjunction with the accompanying drawing.

In the drawing:

FIG. 1 is a perspective view showing a schematic construction of a conventional orthogonal type gas laser oscillator;

FIG. 2 is a cross-sectional view of the conventional orthogonal type gas laser oscillator shown in FIG. 1, taken along a line A—A therein;

DETAILED DESCRIPTION OF THE PREFERRED EMBODIMENT

In the following, the present invention will be described in specific details with reference to the preferred embodiments thereof as shown in the accompanying drawing.

Figure 3:
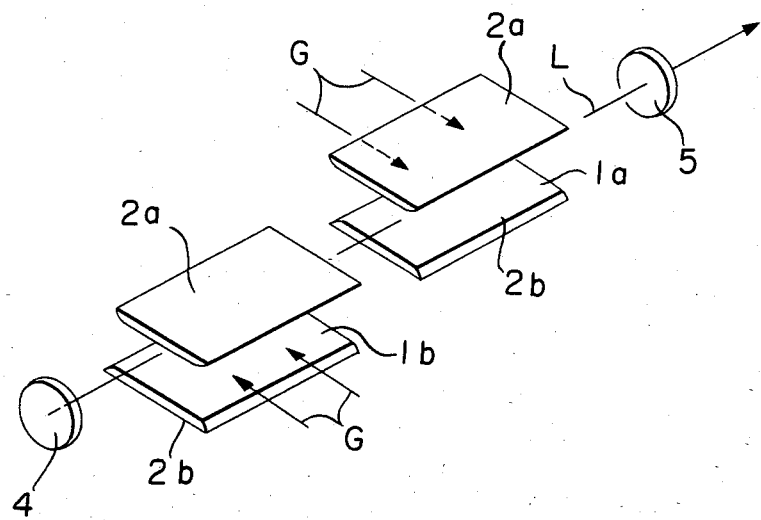
FIG. 3 is a perspective view showing a schematic construction of one embodiment of the orthogonal type gas laser oscillator according to the present invention.

FIG. 3 is a perspective view showing a schematic construction of the orthogonal type gas laser oscillator according to one preferred embodiment of the present invention. In the drawing, reference numerals 1a and 1b designate exciting regions which are provided independently and separately at two positions. Each of the exciting regions is defined by the electrodes 2a and 2b, and produces the laser excitation by electric discharge between the electrodes 2a and 2b. A total reflection mirror 4 and a partial reflection mirror 5 are disposed at both ends on the resonant optical axis L passing through the center of each of the exciting regions 1a and 1b separately and independently provided at two positions. The exciting regions 1a and 1b are so constructed that stream G of the laser medium gas such as $CO_2$ gas may flow in the direction orthogonal to the resonant optical axis L and in the counter-current as viewed from the direction of the resonant optical axis L.

Figure 5:
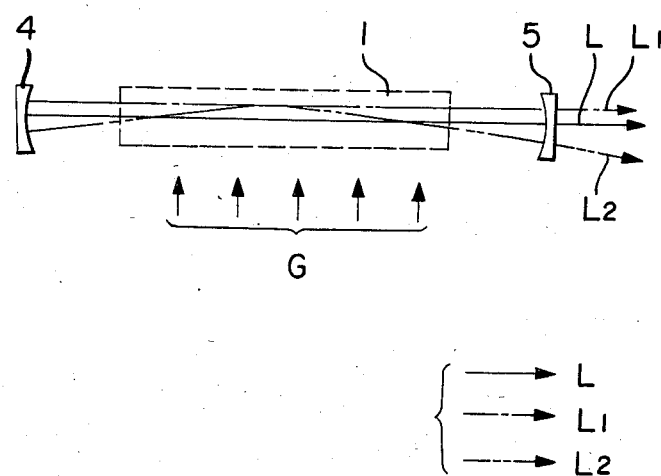
FIGS. 5 and 6 are respectively diagrams for explaining the operations of the conventional orthogonal type gas laser oscillator and the inventive orthogonal type gas laser oscillator.
Figure 6:
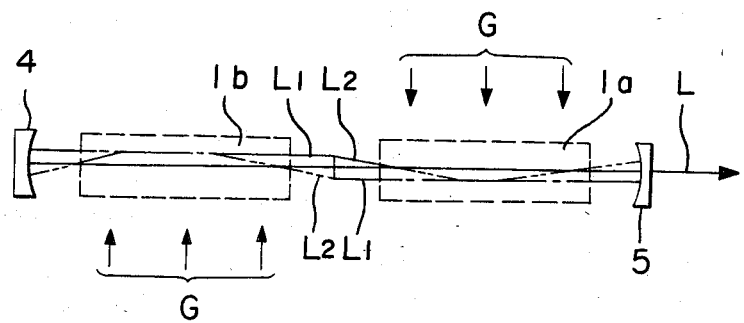

FIGS. 5 and 6 are respectively explanatory diagrams for explaining the operations of the conventional orthogonal type gas laser oscillator and the inventive orthogonal type gas laser oscillator. According to the conventional orthogonal type gas laser oscillator shown in FIG. 5, as has been described in the foregoing, there inevitably take place optical distortion $L_1$ due to the parallel movement of the resonant optical axis L caused by variations in the exciting input with respect to the established resonant optical axis L, or an optical distortion $L_2$ due to bending of the resonant optical axis L caused by the temperature difference between the in-flow laser medium gas and the out-flow laser medium gas. In contrast to this, according to the orthogonal type gas laser oscillator of the present invention as shown in FIG. 6, the optical deflections $L_1$ and $L_2$ at the above-mentioned two exciting regions 1a and 1b can be offset substantially perfectly by causing the laser gas stream G in the exciting regions 1a and 1b to flow in counter-current, because the optical distortions $L_1$ and $L_2$ in the above-mentioned exciting region 1a and the optical distortions $L_1$ and $L_2$ in the above-mentioned exciting region 1b are the essential phenomena to be derived from the directivity of the laser gas stream G of the laser medium gas.

Figure 4:
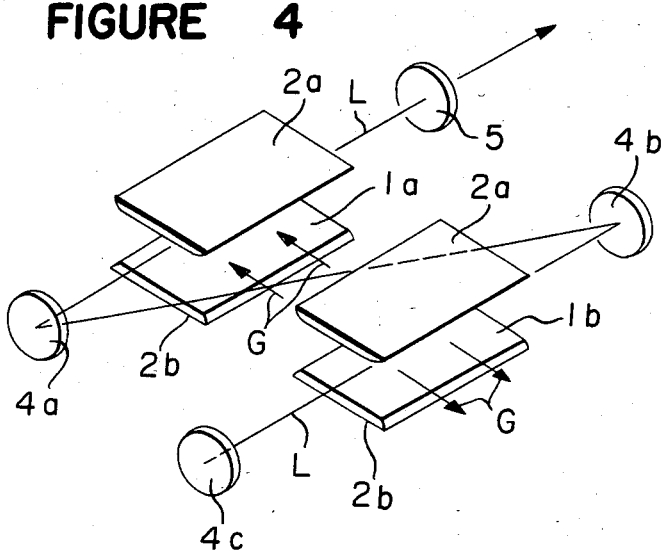
FIG. 4 is also a perspective view showing a schematic construction of another embodiment of the orthogonal type gas laser oscillator according to the present invention.

FIG. 4 is a perspective view showing a schematic construction of the orthogonal type gas laser oscillator according to another embodiment of the present invention. The gas laser oscillator shown in FIG. 4 is of such a construction that, different from that shown in FIG. 3, the two independent exciting regions 1a and 1b are disposed parallel each other, and the total reflection mirrors 4a, 4b and 4c and the partial reflection mirror 5 are disposed at their respective positions as illustrated, thereby forming the optical resonator. In such optical resonator as in the above-described construction, when the laser gas stream G is caused to flow in the mutually opposite directions in the respective exciting regions 1a and 1b as viewed from the direction of the resonant optical axis L, there can be obtained the same effect as is the case with the first embodiment shown in FIG. 3.

Figure 7:
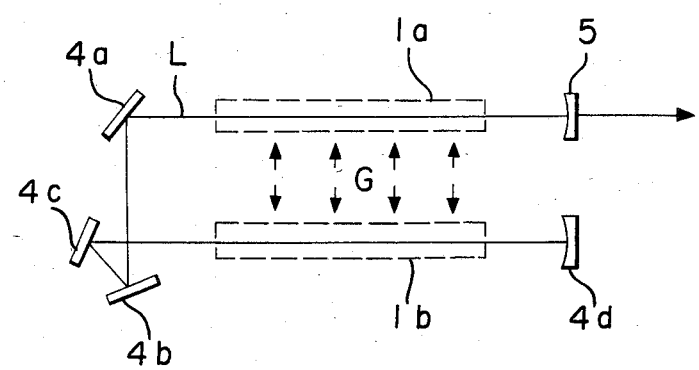
FIGS. 7 and 8 are respectively diagrams for explaining the operations of the orthogonal type gas laser oscillator according to further embodiments of the present invention.
Figure 8:
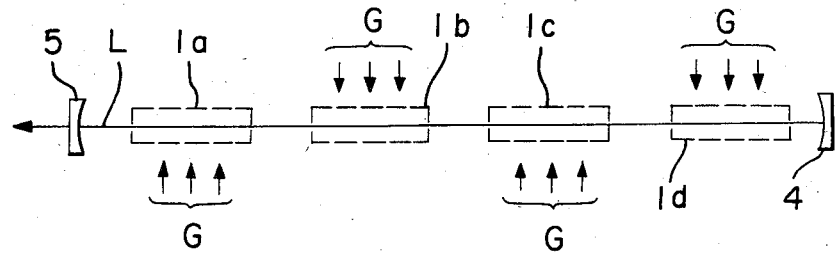

FIGS. 7 and 8 are respectively diagrams for explaining the operations of the orthogonal type gas laser oscillator according to further embodiments of the present invention. The embodiment shown in FIG. 7 is of the same construction as that shown in FIG. 4 in respect of the positions of the two independent exciting regions 1a and b and the flowing direction of the laser gas stream G in each exciting region, with the exception that the total reflection mirrors 4a, 4b, 4c and 4d and the partial reflection mirror 5 are arranged at their respective positions as shown in the drawing, thereby constructing a modified optical resonator. The same resulting effect can be obtained as in the foregoing embodiments by changing the resonant optical axis L. The embodiment shown in FIG. 8 is of such a construction that four independent exciting regions 1a, 1b, 1c and 1d are disposed in series in the direction of the resonant optical axis L to form the optical resonator. In such construction of the optical resonator, the flowing direction of the laser gas stream G in the two exciting regions 1a and 1c and the flowing direction of the laser gas stream G in the other two exciting regions 1b and 1d are mutually opposed. In this embodiment, too, the same resulting effect as in the above-mentioned embodiments can be obtained.

It should be noted that, in each of the embodiments of the present invention as has been explained so far, explanations have been made with reference to a triaxially orthogonal $CO_2$ gas laser oscillator as an example, although the present invention is equally applicable to other type of the laser exciting means such as, for example, a biaxially orthogonal type $CO_2$ gas laser, wherein the direction of the laser gas stream G is identical with the direction of the electric discharge, and yet the same effect as in the above-mentioned embodiments can be obtained. Further, the laser medium gas is not limited to $CO_2$ gas molecules, but other gas molecules such as, for example, carbon monoxide (CO), nitrogen ($N_2$), nitrogen (N), and so on may be used with the same effect as in the above-mentioned embodiments.

As has so far been explained in the foregoing, since the orthogonal type gas laser oscillator accoding to the present invention is of such a construction that even number of the independent exciting regions are provided, and the direction of the laser gas stream in one half of the exciting region and the direction of the laser gas stream in the remaining half of the laser gas stream are made mutually opposite, there can be exhibited a particularly excellent effect such that the orthogonal type gas laser oscillator with more stabilized resonant optical axis of the laser beam, the laser output, and the laser beam quality than those of this type of conventional gas laser oscillator can be obtained.

In the foregoing, the present invention has been described in detail with specific reference to the preferred embodiments thereof. It should, however, be noted that the present invention is not limited to these embodiments alone, but any changes and modifications may be made thereto by those persons skilled in the art within the spirit and scope of the invention as recited in the appended claims.

I claim:

1. An orthogonal type gas laser oscillator, which includes:
   (a) an even number of independent pairs of opposing electrodes, disposed along the optical axis of said oscillator;
   (b) a laser medium gas which flows in a predetermined direction transverse to said optical axis through one half of said even number of electrode pairs, and flows through the remaining one half of said electrode pairs in a direction opposite to said transverse direction;
   (c) wherein the deflections of the optical axis of the electrode pairs due to the movement of the laser medium gas offset each other.

2. The orthogonal type gas laser oscillator according to claim 1, in which said even number of electrode pairs are disposed in series.

3. An orthogonal type gas laser oscillator according to claim 2, in which a total reflection mirror and a partial reflection mirror delimit said oscillator and wherein said serially disposed electrode pairs are interposed between said mirrors.

4. The orthogonal type gas laser oscillator according to claim 3, in which said even number of electrode pairs is two (2).

5. The orthogonal type gas laser oscillator according to claim 3, in which said even number of electrode pairs is four (4) or more.

6. The orthogonal type gas laser oscillator according to claim 5, in which the flowing direction of said laser medium gas in each of the adjacent electrode pairs of said even number of electrode pairs is made mutually opposite.

7. The orthogonal type gas laser oscillator according to claim 1, in which said even number of electrode pairs are disposed in parallel.

8. The orthogonal type gas laser oscillator according to claim 7, in which said even number of electrode pairs is two (2).

9. The orthogonal type gas laser oscillator according to claim 8, further including a partial reflecting mirror and a first total reflecting mirror which delimit a laser cavity and which are in parallel relationship, said two electrode pairs being placed between said partial reflecting mirror and said first total reflecting mirror along said optical axis, a second and third total reflecting mirror placed between said electrode pairs in reflecting relation with each other for folding said optical axis from one electrode pair to the other electrode pair and wherein said partial reflecting mirror and said third total reflecting mirror are in reflecting relationship through one electrode pair and said first total reflecting mirror and said second total reflecting mirror are in reflecting relationship through the other electrode pair.

10. The orthogonal type gas laser oscillator according to claim 9 wherein said partial reflecting mirror and said second total reflecting mirror are at the same end of said electrode pairs.

11. The orthogonal type gas laser oscillator according to claim 9 wherein said partial reflecting mirror and said second total reflecting mirror are at opposite ends of said electrode pairs.

12. The orthogonal type gas laser oscillator according to claim 11, further including a fourth total reflecting mirror placed at the same end of said other electrode pair as said second total reflecting mirror and in reflecting relationship with said second total reflecting mirror.

13. The orthogonal type gas laser oscillator according to claim 1, in which said laser oscillator is a biaxially orthogonal type where the direction of movement of said laser medium gas and the direction of electrode discharge across the mutually opposed pairs of electrodes are in the same direction.

14. The orthogonal type gas laser oscillator according to claim 1, in which the laser oscillator is a triaxially orthogonal type where the direction of movement of said laser medium gas, the direction of electric discharge across the mutually opposed pair of electrodes and the optical axis of the laser are in an orthogonal relationship.

15. The orthogonal type gas laser oscillator according to claim 1, in which said laser medium gas consists principally of carbon dioxide.

16. The orthogonal type gas laser oscillator according to claim 1, in which said laser medium gas is a mixture of $CO_2$, $CO$, $N_2$ and N.

17. A triaxially orthogonal type carbon dioxide gas laser oscillator which includes:
   (a) two sets of mutually opposed pairs of electrodes, each pair being connected to a power source;
   (b) a laser medium gas consisting principally of carbon dioxide gas, said laser medium gas flowing in a direction perpendicular to opposing direction of said pairs of a line between the electrodes in a pair, and flowing in opposite directions in said two pairs of electrodes; and
   (c) a laser resonator composed of a total reflection mirror and a partial reflection mirror, delimiting said oscillator and wherein said two pairs of electrodes are disposed between said mirrors in series and along the laser optical axis, and also disposed in such a manner that the direction of movement of said laser medium gas and said laser optical axis are orthogonal.

* * * * *